US009532388B2

(12) United States Patent
Panchal et al.

(10) Patent No.: US 9,532,388 B2
(45) Date of Patent: Dec. 27, 2016

(54) ACTIVATING AND DEACTIVATING TRANSMISSION TIME INTERVAL BUNDLING

(71) Applicant: Verizon Patent and Licensing Inc., Arlington, VA (US)

(72) Inventors: Jignesh S. Panchal, Somerset, NJ (US); Yee Sin Chan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 253 days.

(21) Appl. No.: 14/313,005

(22) Filed: Jun. 24, 2014

(65) Prior Publication Data

US 2015/0373748 A1 Dec. 24, 2015

(51) Int. Cl.
*H04W 76/02* (2009.01)
*H04L 1/00* (2006.01)

(52) U.S. Cl.
CPC ............. *H04W 76/02* (2013.01); *H04L 1/00* (2013.01); *H04L 1/0007* (2013.01)

(58) Field of Classification Search
CPC ..... H04W 76/02; H04W 72/0406; H04L 1/00; H04L 1/0007; H04B 7/26
USPC ........................................................ 370/336
See application file for complete search history.

(56) References Cited

U.S. PATENT DOCUMENTS

2011/0141991 A1* 6/2011 Gao ..................... H04L 1/1887
370/329
2014/0334448 A1* 11/2014 Langereis ......... H04W 36/0072
370/331

OTHER PUBLICATIONS

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300, V12.1.0, Mar. 2014, 209 pages.

(Continued)

*Primary Examiner* — Kan Yuen
*Assistant Examiner* — Richard Chang

(57) ABSTRACT

A device is configured to send a connection message to a user device while a communication session is being established with the user device. The connection message may indicate a transmission time interval bundling (TTI-B) configuration to be configured by the user device. The device may determine to activate the TTI-B configuration after the communication session is established. The device may send a control message to the user device during the communication session. The control message may instruct the user device to activate the TTI-B configuration configured by the user device. The device may activate the TTI-B configuration for use during the communication session. The device may receive uplink data, from the user device, during the communication session based on activating the TTI-B configuration and sending the control message.

20 Claims, 11 Drawing Sheets

(56) References Cited

OTHER PUBLICATIONS

3$^{rd}$ Generation Partnership Project, "Technical Specification Group Radio Access Network; Evolved Universal Terrestrial Radio Access (E-UTRA); Medium Access Control (MAC) protocol specification (Release 12)", 3GPP TS 36.321, V12.1.0, Mar. 2014, 57 pages.
3$^{rd}$ Generation Partnership Project, "Technical Specification Group Radio Access Network; Evolved Universal Terrestrial Radio Access (E-UTRA); Radio Resource Control (RRC); Protocol specification (Release 12)", 3GPP TS 36.331, V12.1.0, Mar. 2014, 356 pages.
Susitaival et al., "LTE Coverage Improvement by TTI Bundling", IEEE, 2009, 5 pages.

\* cited by examiner

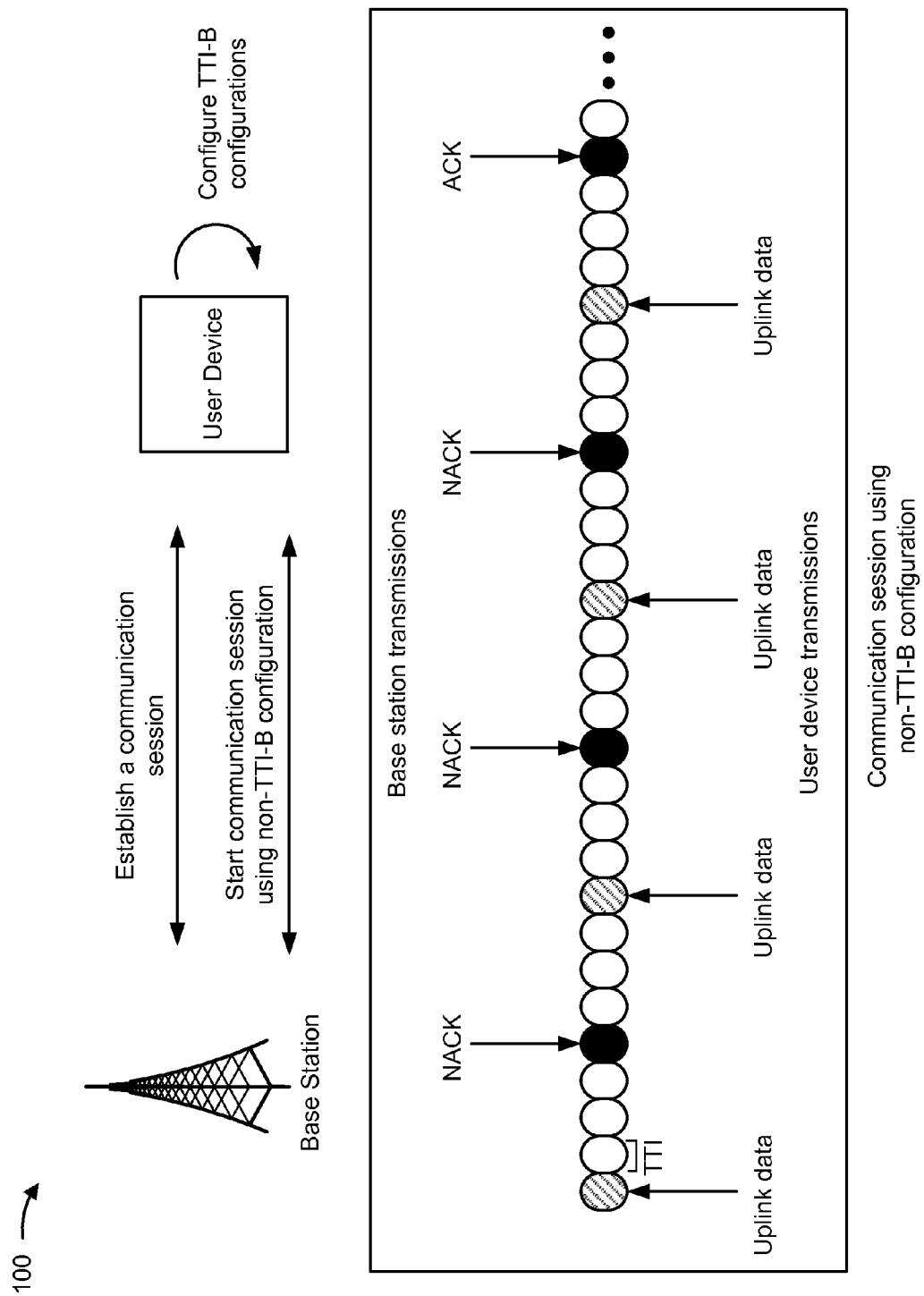

ACTIVATING AND DEACTIVATING TRANSMISSION TIME INTERVAL BUNDLING

BACKGROUND

Transmission time interval bundling (TTI-B) is a feature designed to improve uplink coverage at a cell edge. In TTI-B, a user device may send a number of redundancy versions of the same uplink data in consecutive transmission time intervals, rather than sending a signal transmission of uplink data. Accordingly, the likelihood that a base station will successfully receive and decode one of the versions of the uplink data is greater than when only a single transmission of the uplink data is sent.

To activate or deactivate TTI-B, the base station may send a message (e.g., a mobility control information message) to the user device that specifies a target base station for handover, which is the same as the base station currently serving the user device. The message may also instruct the user device to activate or deactivate TTI-B. In other words, the base station may perform a handover of a communication session to itself (e.g., an intra-cell handover), thereby performing a media access control (MAC) reset to communicate using TTI-B or to stop communicating using TTI-B.

BRIEF DESCRIPTION OF THE DRAWINGS

FIGS. 1A and 1B are diagrams of an overview of an example implementation described herein;

DETAILED DESCRIPTION OF PREFERRED EMBODIMENTS

The following detailed description of example implementations refers to the accompanying drawings. The same reference numbers in different drawings may identify the same or similar elements.

After the MAC has been reset to activate or deactivate TTI-B via an intra-cell handover, the user device and the base station may be required to resynchronize an uplink timing using a contention-based or contention-free random access procedure. For example, the random access procedure may include the user device sending a preamble message to the base station, the base station sending a response to the preamble message, the user device sending a connection request to the base station, and the base station sending a contention resolution message to the user device.

However, any type of random access procedure may be occurring while a user device is at a cell edge or is experiencing poor radio frequency (RF) conditions. In fact, the base station may be attempting to activate TTI-B because these poor RF conditions exist. But these poor RF conditions may also cause the random access procedure to fail resulting in intra-cell handover failure and the communication session to be dropped. This radio link discontinuity may cause service interruption, such as dropping a voice over long term evolution (VoLTE) call.

Accordingly, attempting to activate or deactivate TTI-B, which is designed to improve service during a communication session, may actually result in the communication session being dropped due to how TTI-B is activated or deactivated.

Implementations described herein may configure TTI-B during setup of a communication session and/or inter-cell handover of the communication session, and activate or deactivate TTI-B during the communication session based on the configured TTI-B. For example, implementations described herein may send a downlink MAC layer command to a user device in a MAC control packet during the communication session to activate or deactivate TTI-B. In some implementations, TTI-B may be activated, modified, or deactivated without having to perform an intra-cell handover.

Figure 1B:
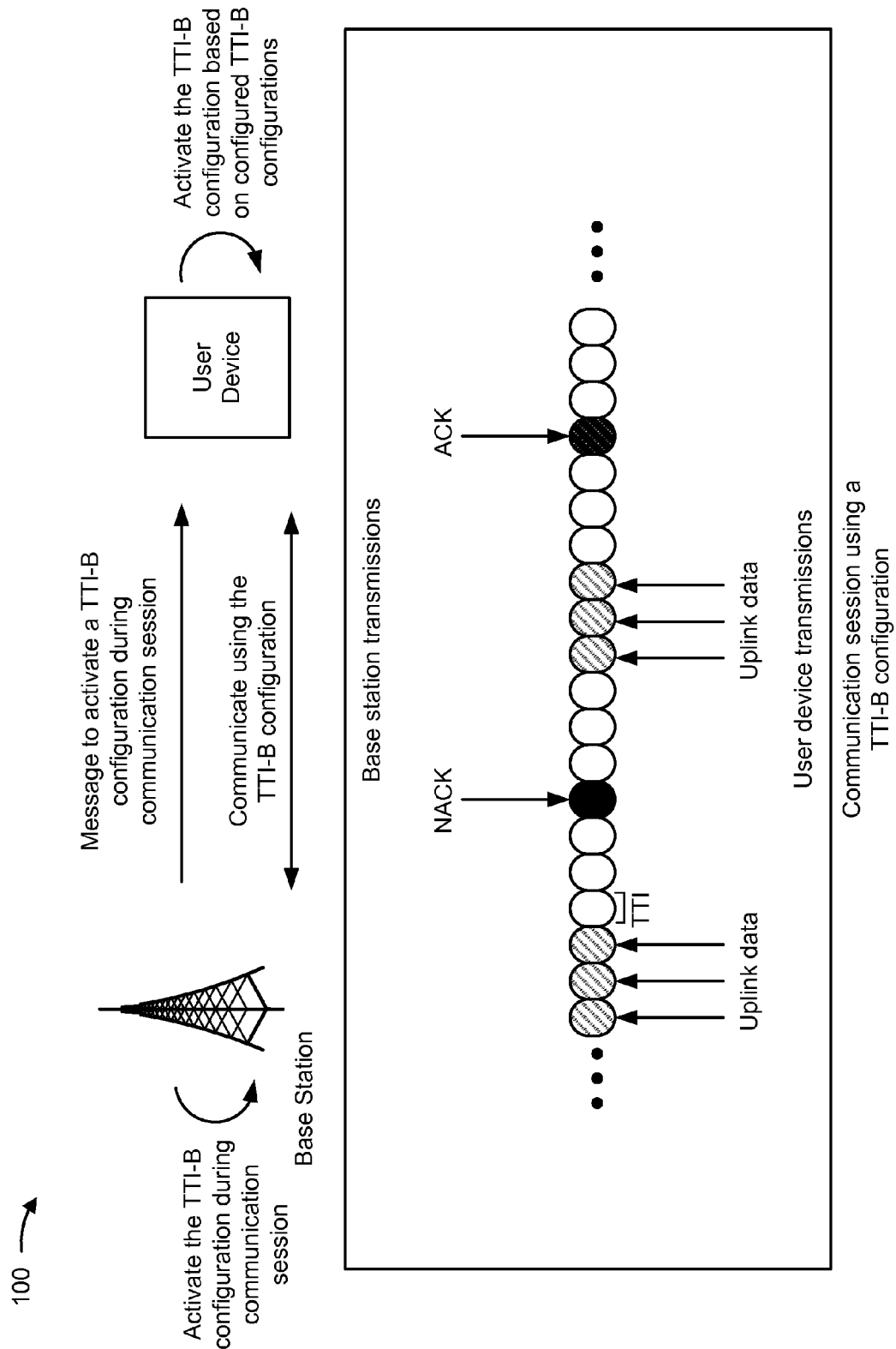

FIGS. 1A and 1B are diagrams of an overview of an example implementation 100 described herein.

In FIG. 1A, assume a base station and a user device establish a communication session and that during the setup of the communication session, the base station instructs the user device to configure multiple TTI-B configurations. A TTI-B configuration may correspond to a number of redundancy versions (X) of the same uplink data bundled together or to be sent in consecutive transmission time intervals when TTI-B is activated. A TTI-B configuration may also include a total number of hybrid automatic repeat request (HARD) transmissions (N). Each TTI-B configuration may by identified by a configuration index (I). The user device may configure the TTI-B configurations by storing information about which TTI-B configurations are supported by the base station, but may not actually activate TTI-B at this time. The base station and the user device may start the communication session using a non-TTI-B configuration (e.g., may communicate without using TTI-B).

As shown in FIG. 1A, when communicating using the non-TTI-B configuration, the user device may send a single transmission of uplink data during a transmission time interval (TTI). The base station may receive the uplink data and process the uplink data for a certain number of transmission time intervals (e.g., three transmission time intervals as shown in FIG. 1A). If the base station is unable to successfully decode the uplink data, the base station may send a negative acknowledgment (NACK) to the user device. The user device may receive the NACK and resend the uplink data to the base station until the user device receives a positive acknowledgment (ACK) from the base station indicating that the uplink data was successfully received and decoded. Poor RF conditions (e.g., a high interference level or a weak signal strength) may result in the base station being unable to successfully decode the uplink data, and may result in multiple retransmissions of the uplink data by the user device.

In FIG. 1B, assume the base station has determined that TTI-B should be activated for the communication session (e.g., based on detecting poor RF conditions). Rather than performing an intra-cell handover to activate TTI-B, the base station may send a message (e.g., a MAC control packet on a downlink shared channel) to activate a particular TTI-B configuration during the communication session. The user device may activate the TTI-B configuration, once all communication using the non-TTI-B configuration is completed, based on the TTI-B configurations configured at the setup of the communication session. Likewise, the base station may activate the TTI-B configuration once all communication using the non-TTI-B configuration is completed and communicate with the user device using the TTI-B configuration, thus ensuring TTI-B state synchronization between the user device and the base station.

As shown in FIG. 1B, when communicating using the TTI-B configuration, the user device may send multiple redundancy versions of the uplink data (e.g., three versions as shown in FIG. 1B) in consecutive transmission time intervals. The base station may receive three versions of the uplink data (e.g., a bundle) and process the uplink data for a certain number of transmission time intervals (e.g., three transmission time intervals as shown in FIG. 1B). If the base station is unable to successfully decode the uplink data, then the base station may send a NACK to the user device. The user device may receive the NACK and resend the multiple redundancy versions of uplink data to the base station until the user device receives an ACK from the base station indicating that the uplink data was successfully received and decoded.

In this way, TTI-B may be configured during setup of a communication session between a user device and a base station, and then a TTI-B configuration may be activated during the communication session based on the configured TTI-B. Moreover, this process may be used to change from one TTI-B configuration to another TTI-B configuration during the communication session. Thus, TTI-B may be activated, modified, or deactivated without having to perform an intra-cell handover which may fail and terminate the communication session.

Figure 2:
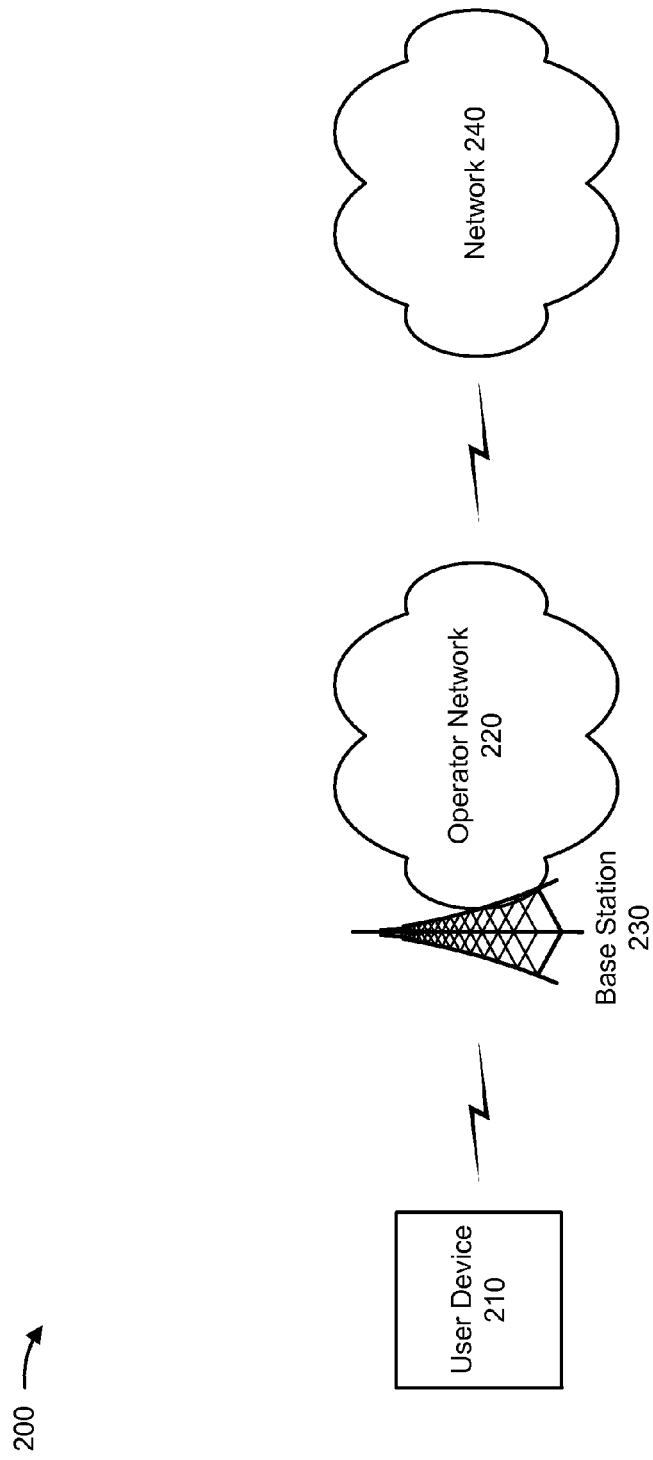
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an operator network 220, a base station 230, and/or a network 240. Devices of environment 200 may interconnect via wired connections, wireless connections, or a combination of wired and wireless connections.

User device 210 may include a device capable of receiving, processing, and providing information. For example, user device 210 may include a mobile phone (e.g., a smart phone, a radiotelephone, etc.), a computing device (e.g., a laptop computer, a tablet computer, a handheld computer, a gaming device, etc.), or a similar device. In some implementations, user device 210 may include a communication interface that allows user device 210 to receive information from and/or transmit information to another device in environment 200.

Operator network 220 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations (e.g., base station 230), such as eNodeBs (eNBs), via which user devices 210 communicate with the EPC. The EPC may include a serving gateway (SGW), a mobility management entity device (MME), and/or a packet data network gateway (PGW) that enables the client devices to communicate with network 240 and/or an Internet protocol (IP) multimedia subsystem (IMS) core. The IMS core may include a home subscriber server (HSS)/authentication, authorization, accounting (AAA) server, a policy and charging rules function (PCRF) server, and/or a call session control function (CSCF) server and may manage certain information and services, such as authentication, session initiation, account information, and/or a user profile, associated with the user devices 210. The LTE network may include multiple base stations 230, and the EPC may include multiple SGWs, MMEs, and/or PGWs. Additionally, or alternatively, operator network 220 may include a cellular network, a public land mobile network (PLMN), a second generation (2G) network, a third generation (3G) network, a fourth generation (4G) network, a fifth generation (5G) network, and/or a similar type of network.

Base station 230 may include one or more devices capable of transferring traffic, such as audio, video, text, and/or other traffic, destined for and/or received from user device 210. In some implementations, base station 230 may include an eNB associated with the LTE network that receives traffic from and/or sends traffic to network 240 via the SGW and/or the PGW. Additionally, or alternatively, one or more base stations 230 may be associated with a RAN that is not associated with the LTE network. Base station 230 may send traffic to and/or receive traffic from user device 210 via an air interface. In some implementations, base station 230 may include a small cell base station, such as a base station of a microcell, a picocell, and/or a femtocell.

Network 240 may include one or more wired and/or wireless networks. For example, network 240 may include a cellular network (e.g., an LTE network, a 3G network, a code division multiple access (CDMA) network, etc.), a PLMN, a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
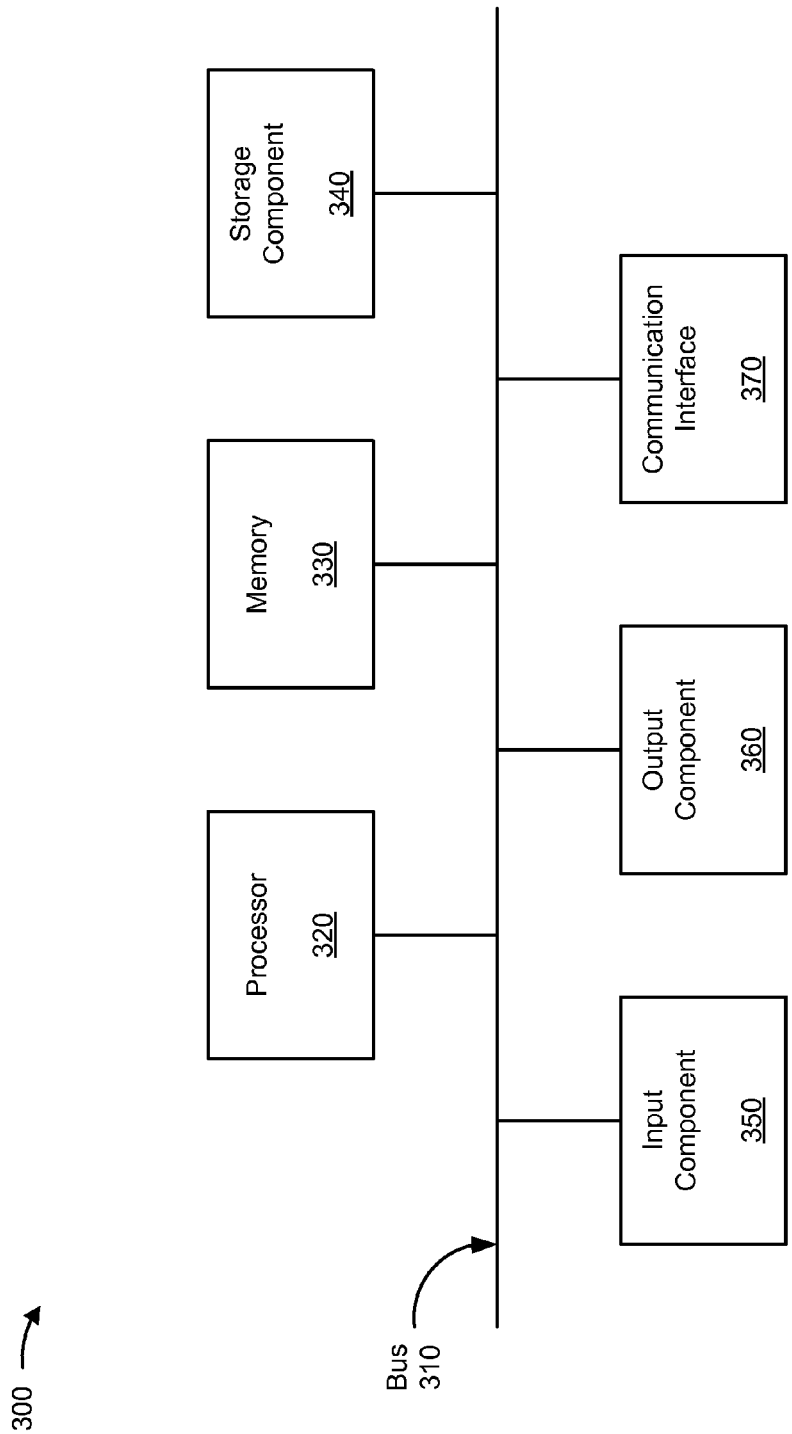
FIG. 3 is a diagram of example components of one or more devices of FIG. 2.

FIG. 3 is a diagram of example components of a device 300. Device 300 may correspond to user device 210, one or more devices included in operator network 220, and/or base station 230. In some implementations, user device 210, the devices included in operator network 220, and/or base station 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions.

Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a RF interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
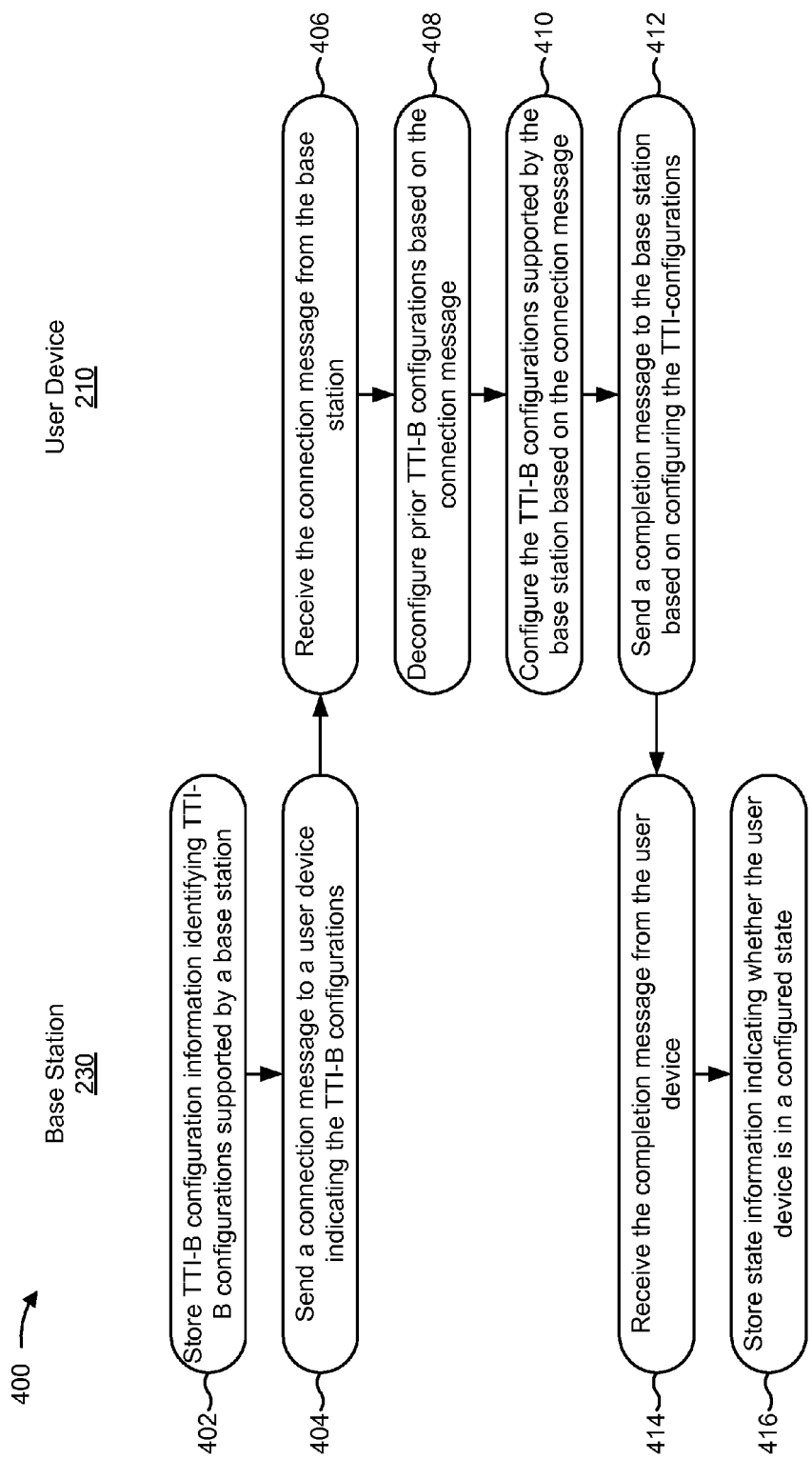
FIG. 4A is a flow chart of an example process for configuring a user device and a base station for TTI-B during setup of a communication session.

FIG. 4A is a flow chart of an example process 400 for configuring user device 210 and base station 230 for TTI-B during setup of a communication session. In some implementations, one or more process blocks of FIG. 4A may be performed by user device 210 and/or base station 230. Additionally, or alternatively, one or more process blocks of FIG. 4A may be performed by another device or a group of devices separate from or including user device 210 and/or base station 230, such as one or more devices included in operator network 220.

As shown in FIG. 4A, process 400 may include storing TTI-B configuration information that identifies TTI-B configurations supported by base station 230 (block 402). For example, base station 230 may store the TTI-B configuration information.

The TTI-B configuration information may include one or more TTI-B index values that are each associated with a unique TTI-B configuration that base station 230 is configured to support. A TTI-B configuration may correspond to a number of redundancy versions of the same uplink data to be sent in consecutive transmission time intervals. A TTI-B configuration may correspond to a number of redundancy versions (X) of the same uplink data bundled together or to be sent in consecutive transmission time intervals when TTI-B is activated and a total number of HARQ transmissions (N) (e.g., a first transmission plus subsequent retransmissions).

As further shown in FIG. 4A, process 400 may include sending a connection message to user device 210 indicating the TTI-B configurations (block 404). For example, base station 230 may send the connection message to user device 210.

In some implementations, the connection message may include a radio resource connection (RRC) reconfiguration message used to modify or setup a RRC connection. Additionally, or alternatively, base station 230 may send the connection message to user device 210 on a downlink dedicated control channel (DCCH).

The connection message may include a message that base station 230 sends to user device 210 during communication session setup and/or a handover procedure. For example, the connection message may be sent while a communication session is being initially setup between user device 210 and operator network 220 via base station 230. Additionally, or alternatively, the connection message may be sent while a communication session is handed over from base station 230 to another base station 230 (e.g., during an inter-cell handover) to add, modify, or delete a TTI-B configuration.

In some implementations, the connection message may include a deconfigure instruction for user device 210 to deconfigure prior TTI-B configurations. For example, user device 210 may store prior TTI-B configuration information identifying TTI-B configurations supported by a prior base station 230 that was previously used to host the communication session (e.g., a base station 230 that handed over the session). The deconfigure instruction may instruct user device 210 to delete or release the previous TTI-B configuration information.

Additionally, or alternatively, the connection message may include a configure instruction for user device 210 to configure TTI-B configurations supported by base station 230 (e.g., the base station 230 that sends the connection message). For example, the configure instruction may include the TTI-B configuration information, including one or more TTI-B index values that are associated with TTI-B configurations that base station 230 is configured to support, and may instruct user device 210 to store the TTI-B configuration information.

As further shown in FIG. 4A, process 400 may include receiving the connection message from base station 230 (block 406). For example, user device 210 may receive the connection message sent by base station 230 on the downlink DCCH.

As further shown in FIG. 4A, process 400 may include deconfiguring prior TTI-B configurations based on the connection message (block 408). For example, user device 210 may deconfigure prior TTI-B configurations based on the deconfigure instruction included in the connection message.

If user device 210 stores prior TTI-B configuration information for TTI-B configurations supported by a prior base station 230 in a memory, user device 210 may deconfigure the prior TTI-B configurations by deleting and/or releasing the prior TTI-B configuration information from the memory. On the other hand, if user device 210 does not store prior TTI-B configuration information (e.g., a prior base station 230 did not support TTI-B and/or a communication session is newly being setup), user device 210 may not deconfigure any prior TTI-B configurations.

As further shown in FIG. 4A, process 400 may include configuring the TTI-B configurations supported by base station 230 based on the connection message (block 410). For example, user device 210 may configure TTI-B configurations supported by base station 230 that sent the connection message based on the configuration instruction included in the connection message.

User device 210 may store the TTI-B configuration information, included in the connection message, in a memory included in or accessible by user device 210. For example, user device 210 may store the one or more TTI-B index values that are each associated with TTI-B configurations that base station 230 is configured to support. In some implementations, only one of the TTI-B configurations may be active at a same time.

User device 210 may enter a configured state based on configuring the TTI-B configurations and user device 210 being capable of communicating using TTI-B. Assume base station 230 is aware of the capabilities of user device 210 in advance. In the configured state, TTI-B may be activated or deactivated by base station 230 during the communication session. As a default, user device 210 may be in a TTI-B deactive state upon configuration of the TTI-B configurations. A TTI-B deactive state may be a state where TTI-B is configured but not active (e.g., not presently being used during the communication session).

On the other hand, user device 210 may be in a deconfigured state if user device 210 is not capable of communicating using TTI-B.

As further shown in FIG. 4A, process 400 may include sending a completion message to base station 230 based on configuring the TTI-B configurations (block 412). For example, user device 210 may send the completion message.

In some implementations, the completion message may include a RRC connection reconfiguration complete message used to confirm the RRC connection reconfiguration. In some implementations, user device 210 may send the completion message on an uplink DCCH to base station 230.

The completion message may indicate whether user device 210 is in a configured state or a deconfigured state. For example, if user device 210 is in a configured state, the completion message may indicate user device 210 is in a configured state. Additionally, or alternatively, the completion message may indicate whether user device 210 is in a TTI-B active state (e.g., TTI-B is presently configured and active or ready to be active) or user device 210 is in a TTI-B deactive state (e.g., TTI-B is presently configured and deactive or ready to be deactive). On the other hand, if user device 210 is in a deconfigured state, the completion message may indicate user device 210 is in a deconfigured state.

As further shown in FIG. 4A, process 400 may include receiving the completion message from user device 210 (block 414). For example, base station 230 may receive the completion message sent by user device 210 on the uplink DCCH.

As further shown in FIG. 4A, process 400 may include storing state information indicating whether user device 210 is in a configured state (block 416). For example, base station 230 may store state information for each user device 210 communicating with base station 230 based on respective completion messages. Base station 230 may store the state information in a memory included in or accessible by base station 230.

The state information may indicate a configured state of user device 210 and be associated with a user device identifier that uniquely identifies user device 210 (e.g., a phone number, an IP address, an international mobile subscriber identity (IMSI), an international mobile station equipment identify (IMEI), a mobile equipment identifier (MEID), a Cell Radio Network Temporary Identification (CRNTI), or the like).

In some implementations, the state information may indicate that user device 210 is in a deconfigured state based on the completion message indicating user device 210 is in a deconfigured state. For example, the state information may indicate that user device 210 is not configured to use TTI-B for communication and that TTI-B may not be activated during the communication session.

In some implementations, the state information may indicate that user device 210 is in a configured state based on the completion message indicating user device 210 is in a configured state. For example, the state information may indicate that user device 210 is configured to use TTI-B for communication and that TTI-B may be activated during the communication session. Additionally, when the state information indicates that user devices 210 is in the configured state, the state information may further indicate whether user device 210 is in a TTI-B active state or a TTI-B deactive state.

In other words, the state information may indicate whether user device 210 is in one of three states: a deconfigured state, a configured and TTI-B deactive state, or a configured and TTI-B active state. Accordingly, upon setup and/or a handover of the communication session, user device 210 may be in a deconfigured state, a configured and TTI-B deactive state, or a configured and TTI-B activate state, and base station 230 may store information indicating the state.

Although FIG. 4A shows example blocks of process 400, in some implementations, process 400 may include additional blocks, fewer blocks, different blocks, or differently arranged blocks than those depicted in FIG. 4A. Additionally, or alternatively, two or more of the blocks of process 400 may be performed in parallel.

Figure 4B:
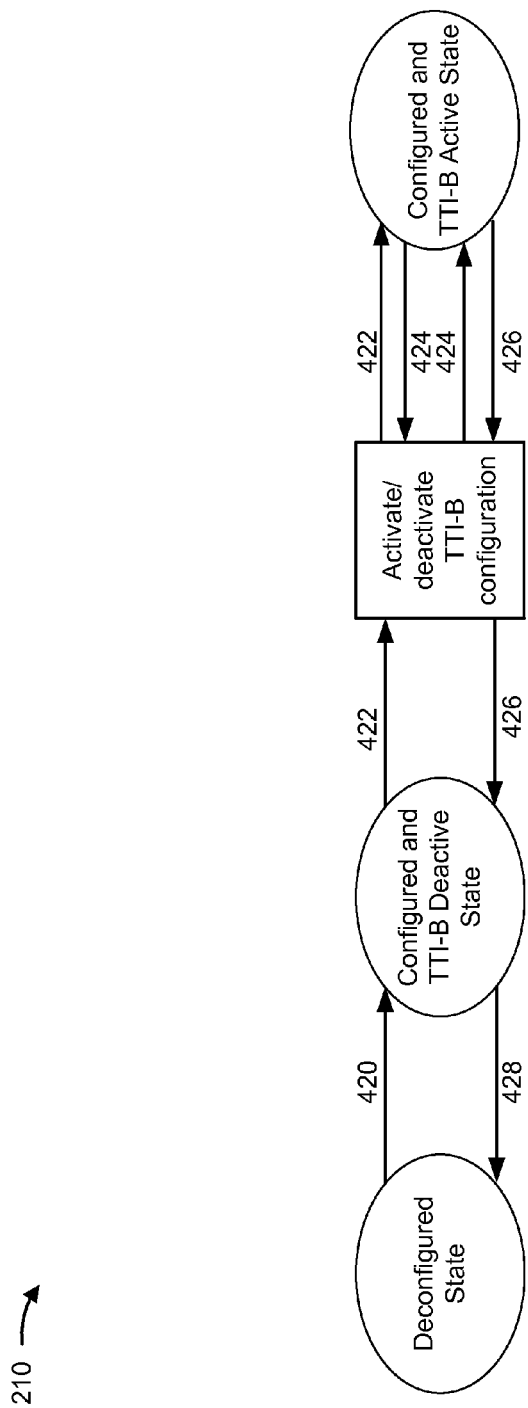
FIG. 4B illustrates an example of a user device being configured as a state machine.

FIG. 4B illustrates an example of user device 210 being configured as a state machine. As shown in FIG. 4B, user device 210 may be thought of as a state machine that switches between a deconfigured state, a configured and TTI-B deactive state, and a configured and TTI-B active state.

User device 210 may switch between the deconfigured state and the configured and TTI-B deactive state by configuring TTI-B configurations (arrow 420). User device 210 may switch between the configured and TTI-B deactive state and the configured and TTI-B active state by activating a TTI-B configuration (arrow 422). While in the configured and TTI-B active state, user device 210 may switch between different TTI-B configurations by deactivating a current TTI-B configuration and activating a new TTI-B configuration (arrow 424).

User device 210 may switch between the configured and TTI-B active state and the configured and TTI-B deactive state by deactivating all TTI-B configurations (arrow 426). User device 210 may switch between the configured and TTI-B deactive state and the deconfigured state by deconfiguring the TTI-B configurations (arrow 428).

As used herein, the term "activate a TTI-B configuration," "activating a TTI-B configuration," or the like may include switching user device 210 from a configured TTI-B deactive state to a TTI-B active state and/or switching user device 210 between TTI-B configurations while in a configured TTI-B active state (e.g., deactivating a first TTI-B configuration currently in use and activating a second TTI-B configuration).

As indicated above, FIG. 4B is provided merely as an example. Other examples are possible and may differ from what was described with regard to FIG. 4B.

Figure 5A:
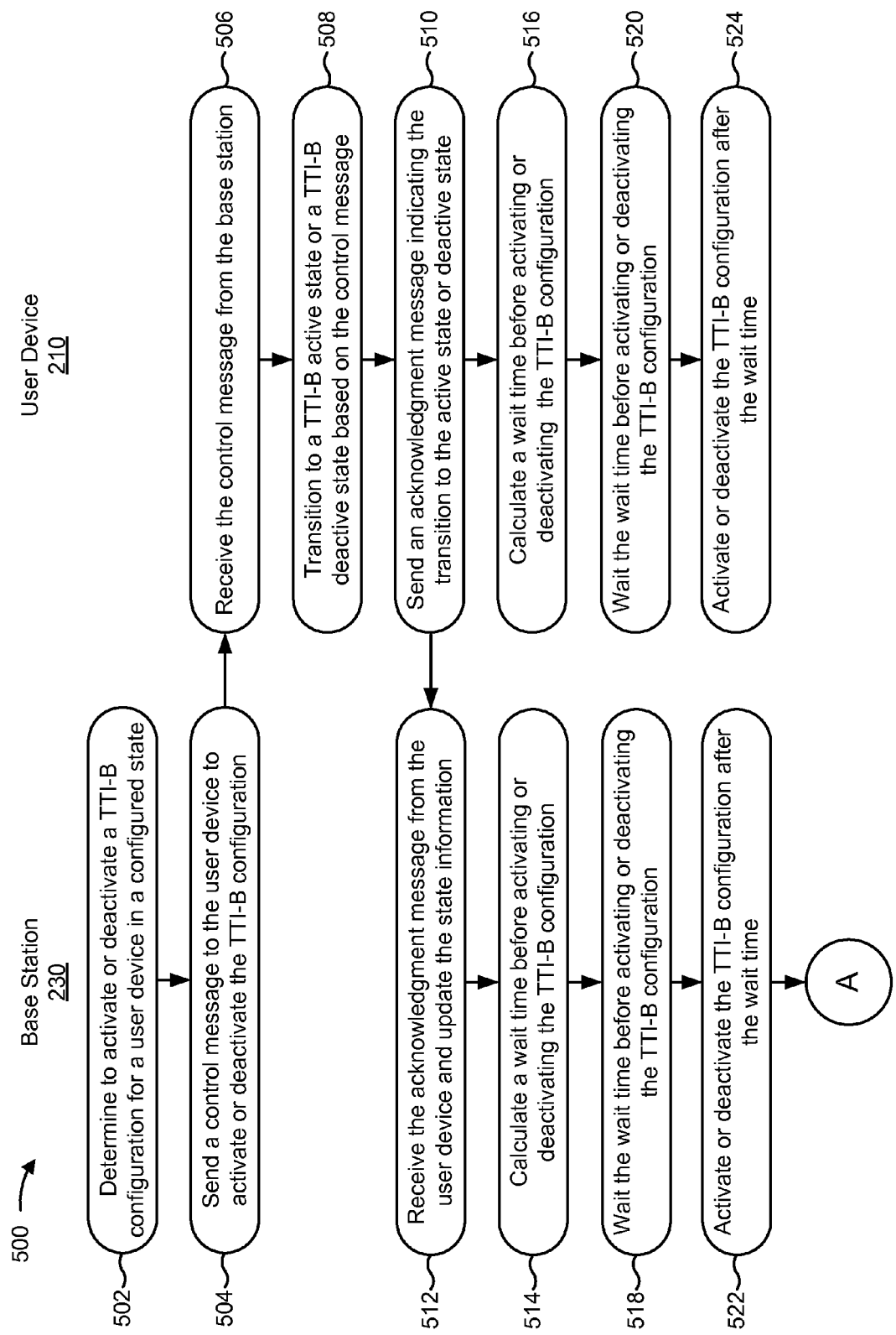
FIGS. 5A and 5B are flow charts of an example process for activating or deactivating TTI-B during a communication session.
Figure 5B:
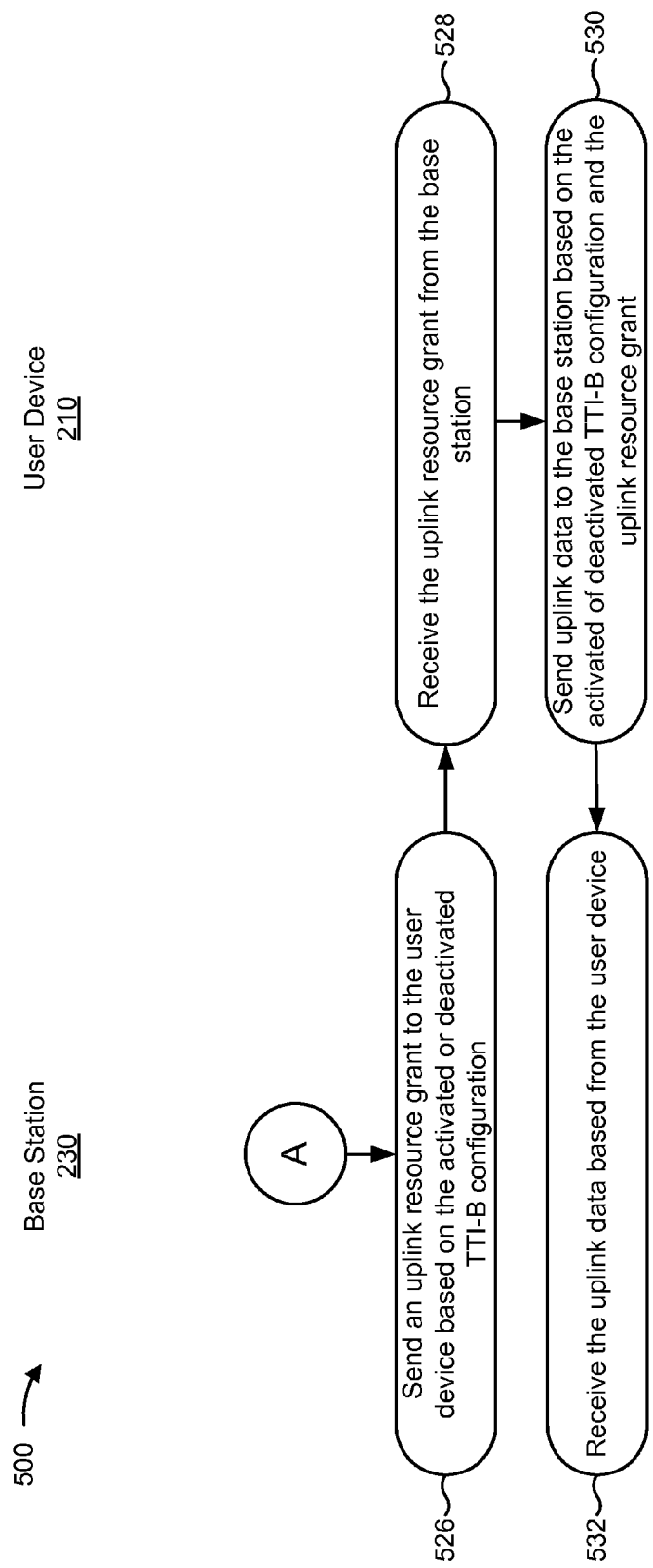

FIGS. 5A and 5B are flow charts of an example process 500 for activating or deactivating TTI-B during a communication session. In some implementations, one or more process blocks of FIGS. 5A and 5B may be performed by user device 210 and/or base station 230. Additionally, or alternatively, one or more process blocks of FIGS. 5A and 5B may be performed by another device or a group of devices separate from or including user device 210 and/or base station 230, such as one or more devices included in operator network 220.

As shown in FIG. 5A, process 500 may include determining to activate or deactivate a TTI-B configuration for user device 210 in a configured state (block 502). For example, base station 230 may determine to activate or deactivate a TTI-B configuration for use during a communication session with a user device 210.

Base station 230 may determine whether user device 210 is in a configured state or a deconfigured state based on the state information stored by base station 230. Base station 230 may not determine to activate or deactivate a TTI-B configuration for a user device 210 in a deconfigured state because the user device 210 may not be capable of using TTI-B. On the other hand, if base station 230 determines user device 210 is in a configured state, base station 230 may determine to activate or deactivate a TTI-B configuration.

Base station 230 may detect a signal characteristic of a RF signal used by user device 210 and base station 230 during the communication session and determine to activate or deactivate a TTI-B configuration based on the signal characteristic. The signal characteristic may indicate a signal strength, an interference level, an error rate, an amount of bandwidth, an amount of throughput, and/or any other kind of signal characteristic of the RF signal.

Each TTI-B configuration may be associated with a particular signal characteristic or combination of signal characteristics that indicate the associated TTI-B configuration should be used. For example, if the signal characteristic satisfies a particular threshold (e.g., a signal strength is lower than a threshold signal strength) then base station 230 may determine a particular TTI-B configuration should be used. If the particular TTI-B configuration is not presently activated for the communication session, then base station 230 may determine to activate the particular TTI-B configuration.

On the other hand, if none of the particular signal characteristics associated with TTI-B configurations are satisfied, then base station 230 may determine to deactivate any active TTI-B configurations or keep user device 210 in a TTI-B deactive state.

In some implementations, when base station 230 determines to activate or deactive a TTI-B configuration, base station 230 may determine to switch user device 210 from a TTI-B deactive state to a TTI-B active state, to switch user device 210 from a TTI-B active state to a TTI-B deactive state, or to switch user device 210 between TTI-B configurations while in a TTI-B active state (e.g., deactivating a first TTI-B configuration currently in use and activating a second TTI-B configuration).

As further shown in FIG. 5A, process 500 may include sending a control message to user device 210 to activate or deactivate the TTI-B configuration (block 504). For example, base station 230 may send the control message to user device 210 during the communication session.

The control message may instruct user device 210 to transition to a TTI-B active state and activate a particular TTI-B configuration. On the other hand, the control message may instruct user device 210 to transition to a TTI-B deactive state and deactivate a TTI-B configuration. In some implementations, the control message may indicate a TTI-B index value associated with a TTI-B configuration to be activated.

In some implementations, the control message may include a MAC control packet. The MAC control packet may indicate one or more TTI-B index values associated with a TTI-B configuration to be activated or deactivated. For example, the MAC control packet may include a string of bits with each bit corresponding to a TTI-B index value (e.g., a first bit may correspond to a first TTI-B index value, a second bit may correspond to a second TTI-B index value, and so on). A first value (e.g., 0) of a bit corresponding to a particular TTI-B index value, may indicate that the associated TTI-B configuration should be deactive. If all the bits corresponding to the TTI-B index value are the first value, then the MAC control packet may be an instruction to enter a TTI-B deactive state. A second value (e.g., 1) of the bit corresponding to the particular TTI-B index value, may indicate that the associated TTI-B configuration should be active. If one of the bits corresponding to the particular TTI-B index value is the second value, then the MAC control packet may be an instruction to enter a TTI-B active state and to activate the TTI-B configuration associated with the TTI-B index value. In some implementations, only one TTI-B configuration may be active at a given time. In some implementations, two or more TTI-B configurations may be active at a given time.

Base station 230 may send the control message to user device 210 on a downlink shared channel (e.g., a Physical Downlink Shared Channel (PDSCH)). Additionally, or alternatively, base station 230 may send the control message to user device 210 on an enhanced Physical Downlink Control Channel (ePDCCH) or a regular Physical Downlink Control Channel (PDCCH) as part of every uplink grant message.

As further shown in FIG. 5A, process 500 may include receiving the control message from base station 230 (block 506). For example, user device 210 may receive the control message sent by base station 230 on the downlink shared channel during the communication session.

As further shown in FIG. 5A, process 500 may include transitioning to a TTI-B active state or TTI-B deactive state based on the control message (block 508). For example, user device 210 may transition to a TTI-B active state if the control message indicates user device 210 should transition to the TTI-B active state. By transitioning to the TTI-B active state, user device 210 becomes ready to activate the TTI-B configuration indicated by the control message, but may not actually activate the TTI-B configuration at this time. Instead, user device 210 may wait a particular wait time before actually activating the TTI-B configuration, as will be discussed in more detail later.

On the other hand, user device 210 may transition to a TTI-B deactive state if the control message indicates user device 210 should transition to the TTI-B deactive state. By transitioning to the TTI-B deactive state, user device 210 becomes ready to deactivate any currently active TTI-B configuration, but may not actually deactivate the TTI-B configuration at this time. Instead, user device 210 may wait a particular wait time before actually deactivating a TTI-B configuration, as will be discussed in more detail later.

As further shown in FIG. 5A, process 500 may include sending an acknowledgment message indicating the transition to the active state or the deactive state (block 510). For example, user device 210 may send the acknowledgment message.

The acknowledgment message may be a HARQ acknowledgment that indicates whether user device 210 successfully received the control message from base station 230 and successfully transitioned to the TTI-B active state or the TTI-B deactive state as instructed. For example, user device 210 may send an ACK indicating that the control message was successfully received if user device 210 successfully received the control message. On the other hand, user device 210 may send a NACK indicating that the control message was not successfully received (e.g., not properly decoded by user device 210) if user device 210 did not successfully receive the control message. If user device 210 did not properly receive the control message, user device 210 may not have properly transitioned to the active or deactive state and may not be ready to activate or deactive the TTI-B configuration as instructed by base station 230.

User device 210 may send the acknowledgment message to base station 230 on an uplink control channel (e.g., a Physical Uplink Control Channel (PUCCH)) or an uplink shared channel (e.g., a Physical Uplink Shared Channel (PUSCH)).

As further shown in FIG. 5A, process 500 may include receiving the acknowledgment message from user device 210 and updating the state information (block 512). For example, base station 230 may receive the acknowledgement message on the uplink control channel or the uplink shared channel, and update the state information.

If the acknowledgment message indicates a NACK, base station 230 may resend the control message to user device 210 (e.g., return to block 504). Base station 230 may continue to resend the control message until base station 230 receives an acknowledgment message indicating an ACK from user device 210.

If the acknowledgment indicates an ACK, base station 230 may update the state information to reflect the state of user device 210. For example, if the control message instructed user device 210 to activate a TTI-B configuration and enter a TTI-B active state, then base station 230 may update the state information to indicate user device 210 is in TTI-B active state and which TTI-B configuration is to be activated. On the other hand, if the control message instructed user device 210 to deactivate a TTI-B configuration and enter a TTI-B deactive state, then base station 230 may update the state information to indicate user device 210 is in a TTI-B deactive state.

As further shown in FIG. 5A, process 500 may include calculating a wait time before activating or deactivating the TTI-B configuration (block 514). For example, base station 230 may calculate the wait time.

In some implementations, base station 230 and user device 210 may wait a particular amount of time so that both base station 230 and user device 210 will be in time synchronization at TTI-B configuration activation. Moreover, base station 230 and user device 210 may wait for uplink data currently being sent from user device 210 to base station 230 using a MAC HARQ process to complete by either successful transmission of the uplink data or an exhaustion of all retransmission opportunities. In other words, base station 230 and user device 210 may wait for uplink data being transmitted using a currently active TTI-B configuration (e.g., by sending a number of redundancy versions of uplink data in consecutive transmission time intervals) or a currently active non-TTI-B configuration (e.g., by sending no redundancy versions of uplink data in consecutive transmission time intervals) to be completed before activating a new TTI-B configuration or deactivating the currently active TTI-B configuration.

Accordingly, base station 230 may calculate a wait time (W) that base station 230 will wait before activating or deactivating the TTI-B configuration. The wait time may be based on a maximum number of HARQ transmissions (N), a round trip time (RTT), and a round trip time factor (F). The maximum number of HARQ transmissions (N) may be the maximum number of transmissions of the same uplink data permitted before exhaustion. The RTT may indicate an amount of time between two consecutive uplink (PUSCH) transmissions of the same HARQ process. The RTT may be based on a transmission time interval (e.g., an amount of time to transmit data) and a processing time required to process data before sending a new transmission. The wait time may also be based on the currently active TTI-B configuration or non-TTI-B configuration (e.g., a number of versions of uplink data (X) bundled together or sent in consecutive transmission time intervals).

In some implementations the wait time may be calculated in terms of number of transmission time intervals (TTIs) using the following formula: $W=F*RTT*(N-1)+(X-1)+8$ TTIs. For example, assume a transmission time interval is 1 millisecond (ms) and a processing time is 3 ms. Further, assume a TTI-B configuration is not active and only one version of the uplink data is sent at a time (e.g., X=1). The RTT may be equal to RTT=8 ms (e.g., 1 ms for user device 210 to transmit uplink data+3 ms for base station 230 to process the uplink data+1 ms for base station 230 to transmit a HARQ acknowledgment+3 ms for user device 210 to process the HARQ acknowledgment). The round trip time factor (F) may be set based on X. For example, F=1 for X=1, and F=2 for $1<X\le 8$. Accordingly, an effective round trip time=$F*RTT=1*8$ ms=8 ms. Further, assuming the maximum number of HARQ transmissions is 5 (e.g., N=5), then the wait time may be equal to $W=(1*8*(5-1))+(1-1)+8$ ms=40 ms.

On the other hand, instead of assuming a TTI-B configuration is not active, assume a TTI-B configuration that sends four versions of uplink data in consecutive transmission time intervals is active (e.g., X=4). Thus, the wait time is equal to $W=2*8*(5-1)+(4-1)+8=75$ ms.

Base station 230 may store information identifying the calculated wait time in a memory included in or accessible by base station 230.

As further shown in FIG. 5A, process 500 may include calculating the wait time before activating or deactivating the TTI-B configuration (block 516). For example, user device 210 may calculate the wait time in the same way as base station 230 at block 514.

As further shown in FIG. 5A, process 500 may include waiting the wait time before activating or deactivating the TTI-B configuration (block 518). For example, base station 230 may start a wait timer upon reception of an acknowledgment message including an ACK. Base station 230 may then wait until the wait timer matches the wait time.

In some implementations, base station 230 may receive uplink data from user device 210 during the wait time (e.g., using the currently active TTI-B configuration or the currently active non-TTI-B configuration). However, base station 230 may not assign any new uplink resource grants to user device 210 during the wait time. An uplink resource grant may grant user device 210 access to radio resources for a certain time to send uplink data to base station 230 on the PUSCH.

As further shown in FIG. 5A, process 500 may include waiting the wait time before activating or deactivating the TTI-B configuration (block 520). For example, user device 210 may start a wait timer upon sending an acknowledgment message including an ACK and wait until the wait timer matches the wait time.

In some implementations, user device 210 may send uplink data to base station 230 during the wait time (e.g., using the currently active TTI-B configuration or the currently active non-TTI-B configuration).

As further shown in FIG. 5A, process 500 may include activating or deactivating the TTI-B configuration after the wait time (block 522). For example, base station 230 may activate or deactivate the TTI-B configuration for use in the communication session with user device 210 by assigning new uplink resource grants to user device 210 with timing specified by the activated TTI-B configuration or the non-TTI-B configuration.

For example, base station 230 may activate a TTI-B configuration, which sends a particular number of redundancy versions of the same uplink data in consecutive transmission time intervals, by generating an uplink resource grant that assigns uplink resources to user device 210 which permit user device 210 to send the particular number of redundancy versions of the same uplink data in consecutive transmission time intervals. Accordingly, base station 230 will expect user device 210 to send the particular number of redundancy versions of the same uplink data in consecutive transmission time intervals.

On the other hand, base station 230 may deactivate a TTI-B configuration, which sends a particular number of redundancy versions of the same uplink data in consecutive transmission time intervals, by generating an uplink resource grant that assigns uplink resources to user device 210 which does not permit user device 210 to send the particular number of redundancy versions in consecutive transmission time intervals. Instead, the uplink resource grant may assign uplink resources to user device 210 that permit user device 210 to send a single version of the uplink data during each transmission.

Base station 230 may activate or deactivate a TTI-B configuration without performing an intra-cell handover of the communication session at the time of activation/deactivation. Moreover, base station 230 may activate or deactivate a TTI-B configuration without resynchronizing an uplink timing with user device 210 using a random access procedure at the time of activation/deactivation.

As further shown in FIG. 5A, process 500 may include activating or deactivating the TTI-B configuration after the wait time (block 524). For example, user device 210 may activate or deactivate the TTI-B configuration for use in the communication session with base station 230 by setting the number of redundancy versions of uplink data sent in consecutive transmission time intervals. User device 210 may activate or deactivate a TTI-B configuration indicated by the control message.

For example, user device 210 may activate a particular TTI-B configuration, indicated by a TTI-B index value in the control message, by setting the number of redundancy versions of uplink data (X) sent in consecutive transmission time intervals to the particular number.

On the other hand, user device 210 may deactivate TTI-B (e.g., all TTI-B configurations), as instructed by the control message, by setting the number of versions of uplink data sent in consecutive transmission time intervals to one (e.g., user device 210 will only transmit one version of the uplink data).

User device 210 may activate or deactivate a TTI-B configuration without performing a handover of the communication session or performing a MAC reset at the time of activation/deactivation. Moreover, user device 210 may activate or deactivate a TTI-B configuration without resynchronizing an uplink timing with base station 230 using a contention-based random access procedure at the time of activation/deactivation.

As shown in FIG. 5B, process 500 may include sending an uplink resource grant to user device 210 based on the activated or deactivated TTI-B configuration (block 526). For example, base station 230 may send the uplink resource grant to user device 210 on a PDCCH. Additionally, or alternatively, base station 230 may send the uplink resource grant to user device 210 on an enhanced Physical Downlink Control Channel (ePDCCH) or a regular Physical Downlink Control Channel (PDCCH) as part of every uplink grant message.

As further shown in FIG. 5B, process 500 may include receiving the uplink resource grant from base station 230 (block 528). For example, user device 210 may receive the uplink resource grant sent by base station 230 on the downlink control channel.

As further shown in FIG. 5B, process 500 may include sending uplink data to base station 230 based on the activated or deactivated TTI-B configuration and the uplink resource grant (block 530). For example, user device 210 may send the uplink data on the PUSCH.

An uplink resource grant may grant user device 210 access to radio resources for a certain time to send uplink data to base station 230 on the PUSCH. For example, if a TTI-B configuration is active, user device 210 may send a number of redundancy versions of uplink data in consecutive transmission time intervals that is consistent with the TTI-B configuration. On the other hand, if a TTI-B configuration is deactive (e.g., a non-TTI-B configuration is active), user device 210 may send a single transmission of the uplink data in a transmission time interval.

As further shown in FIG. 5B, process 500 may include receiving the uplink data from user device 210 (block 532). For example, base station 230 may receive the uplink data sent by user device 210 on the PUSCH. Base station 230 may process the uplink data, send an acknowledgment message (e.g., an ACK or a NACK) to user device 210 indicating with the uplink data was properly received, and send the uplink data to network 240 via operator network 220.

Although FIGS. 5A and 5B show example blocks of process 500, in some implementations, process 500 may include additional blocks, fewer blocks, different blocks, or differently arranged blocks than those depicted in FIGS. 5A and 5B. Additionally, or alternatively, two or more of the blocks of process 500 may be performed in parallel.

Figure 6A:
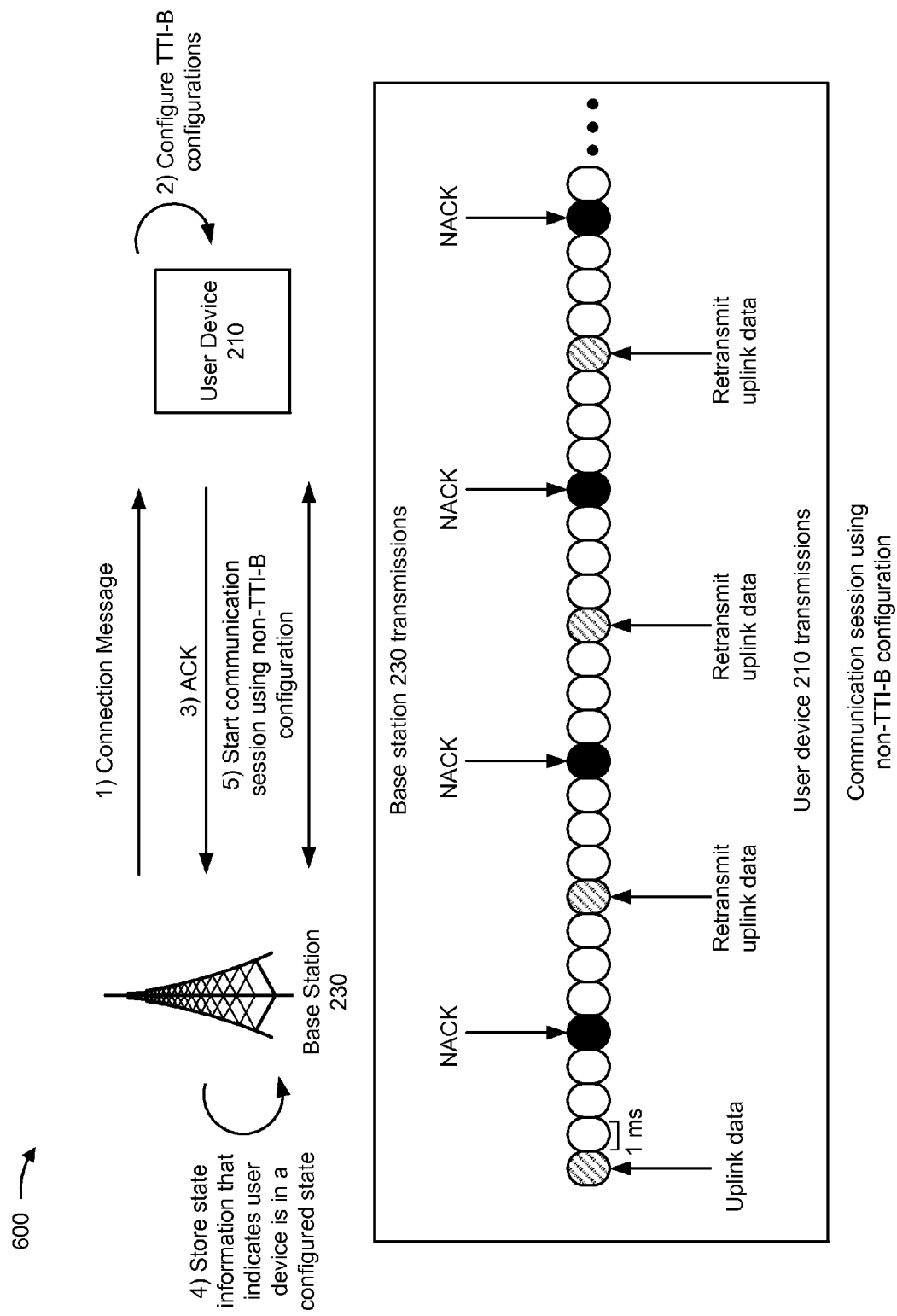
FIGS. 6A-6C are diagrams of an example implementation relating to the example processes shown in FIGS. 4A-5B.
Figure 6B:
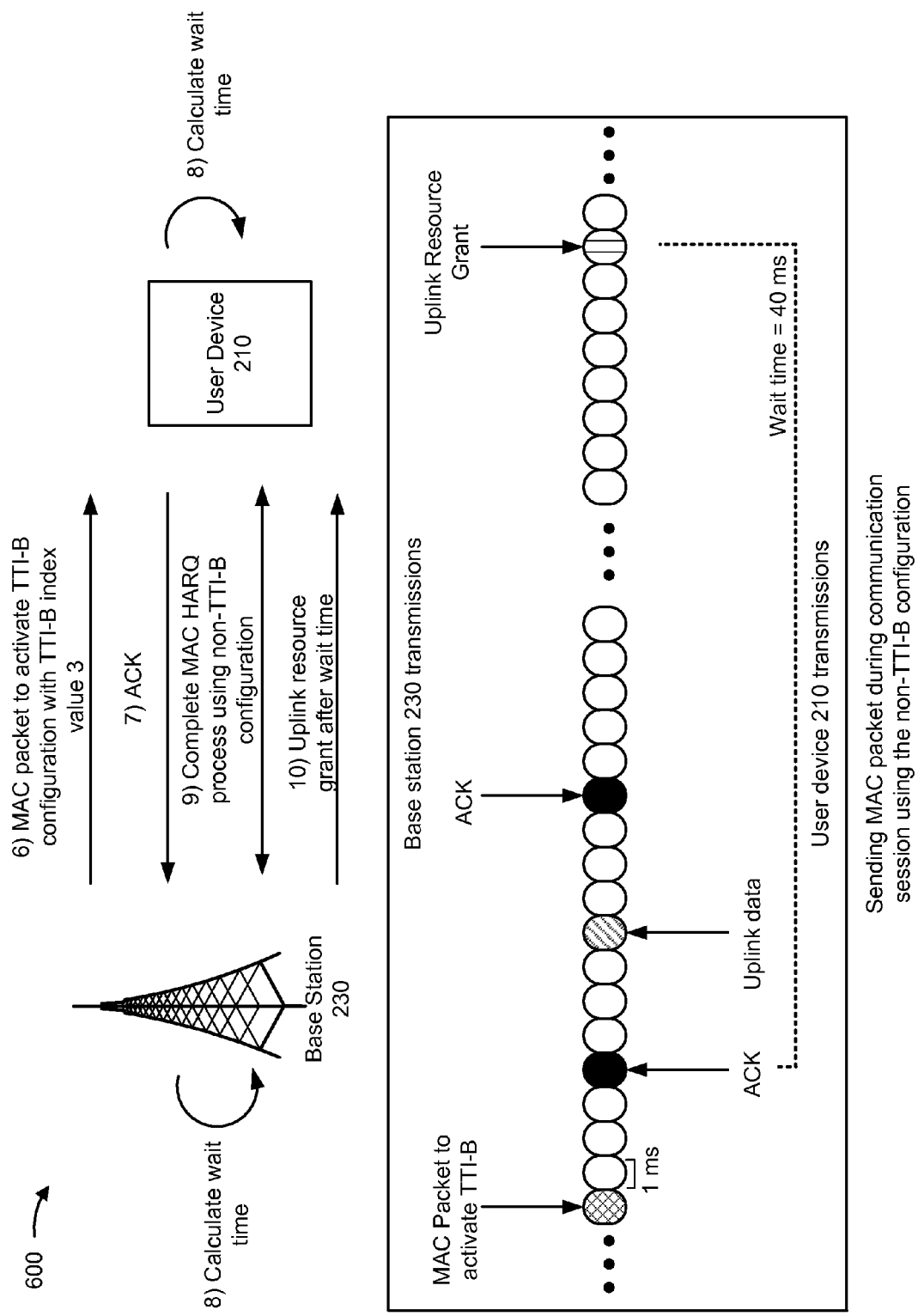
Figure 6C:
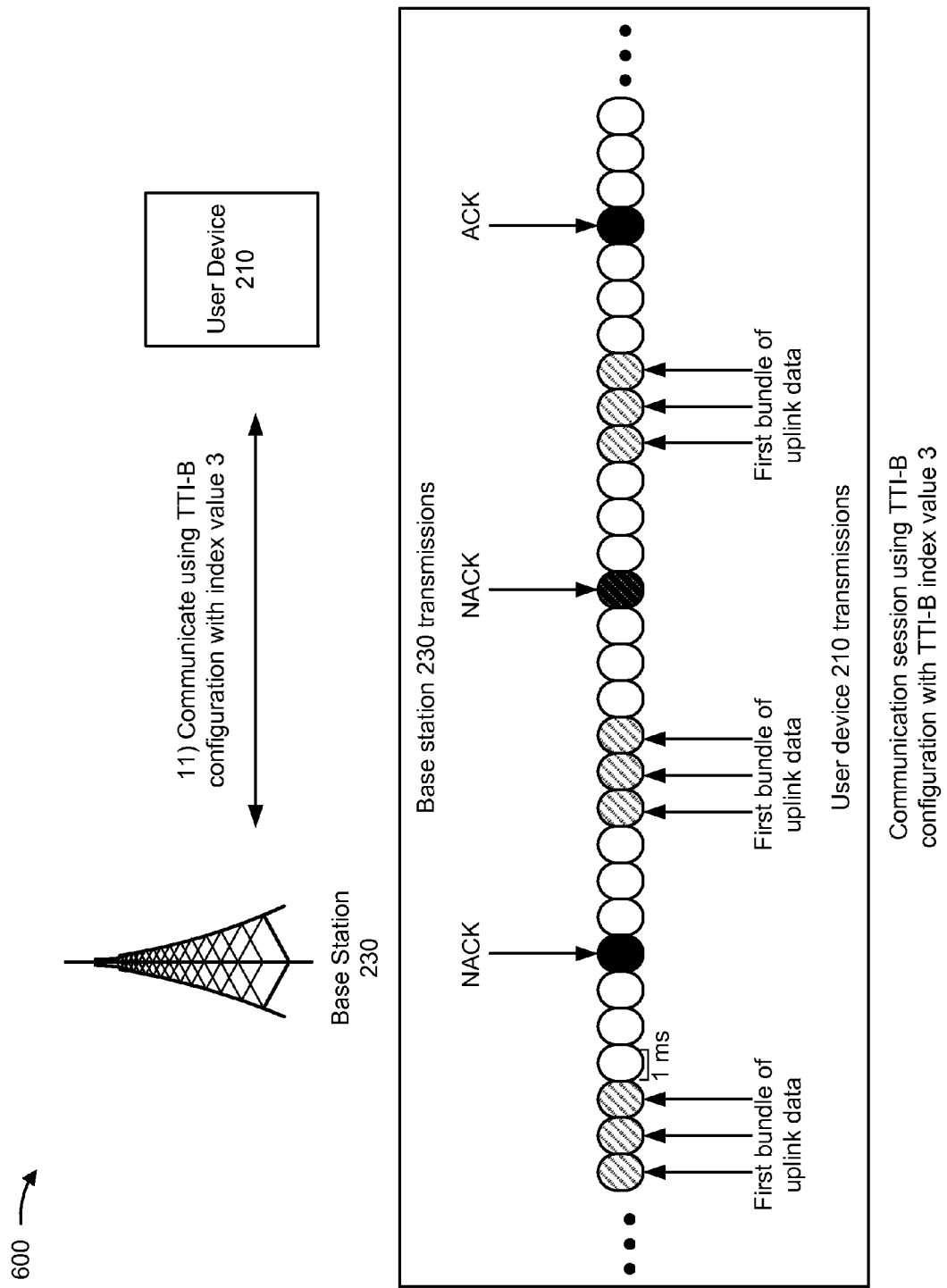

FIGS. 6A-6C are diagrams of an example implementation 600 relating to example processes 400 and 500 shown in FIGS. 4A-5B. FIGS. 6A-6C show an example of configuring user device 210 and base station 230 for TTI-B during setup of a communication session, and activating TTI-B during the communication session.

As shown in FIG. 6A, base station 230 may send a connection message (e.g., a RRC reconfiguration message) to user device 210 on a downlink DCCH while a communication session is being setup between base station 230 and user device 210. Assume the connection message includes an instruction to configure TTI-B configurations with TTI-B index values of 2, 3, 4, and 5.

User device 210 may receive the connection message and configure the TTI-B configurations by storing the TTI-B index values. User device 210 may send an ACK to base station 230, on an uplink DCCH, which indicates that user device 210 successfully configured the TTI-B configurations.

Base station 230 may receive the ACK and store state information for user device 210 indicating that user device 210 is in a configured and TTI-B deactive state. Base station 230 and user device 210 may start the communication session with TTI-B deactivated (e.g., using a non-TTI-B configuration).

As shown in FIG. 6A, when communicating using the non-TTI-B configuration, user device 210 may send a single transmission of uplink data during a transmission time interval (e.g., 1 ms as shown in FIG. 6A). Base station 230 may receive the uplink data and process the uplink data for a certain number of transmission time intervals (e.g., 3 ms as shown in FIG. 6A). If base station 230 is unable to successfully decode the uplink data, then base station 230 may send a NACK to user device 210 after 4 ms. User device 210 may receive the NACK and resend the uplink data to base station 230 8 ms (F*RTT=1*8=8 ms) after the last uplink transmission on PUSCH. User device 210 may resend data on uplink until user device 210 receives an ACK from base station 230 or user device 210 exhausts a maximum number of transmission opportunities (N). Assume N=5 in implementation 600.

In FIG. 6B, assume base station 230 determines a TTI-B configuration with a TTI-B index value of 3 should be activated based on the RF conditions, where the index (I)=3 corresponds to X=3 and N=5. As shown in FIG. 6B, base station 230 may send a MAC packet to activate the TTI-B configuration, with the TTI-B index value of 3, to user device 210 on a PDSCH.

User device 210 may receive the MAC packet and transition to a TTI-B active state where user device 210 is ready to activate the TTI-B configuration with the TTI-B index value of 3. User device 210 may send an ACK to base station 230 indicating that user device 210 has successfully transitioned to the TTI-B active state. Base station 230 may receive the ACK and calculate a wait time before activating the TTI-B configuration.

In implementation 600, assume a transmission time interval (TTI) is equal to 1 ms, and a number of versions of uplink data (X) sent in consecutive transmission time intervals is currently equal to 1. Thus, F=1 and effective RTT=8 ms. Base station 230 may calculate the wait time (W) using W=1*8*(5−1)+(1−1)+8=40 ms. User device 210 may similarly calculate the wait time to be 40 ms.

Base station 230 may start a wait counter when the ACK is received from user device 210 and wait until the wait time expires before activating the TTI-B configuration with the TTI-B index value of 3. As shown in FIG. 6B, while base station 230 is waiting, user device 210 may continue to send uplink data to base station 230 using the non-TTI-B configuration. For example, as shown in FIG. 6B, user device 210 may send uplink data 4 ms after user device 210 sends the ACK to base station 230. Even if the MAC HARQ process using the non-TTI-B configuration completes before the wait time expires (e.g., only one transmission of uplink data is sent instead of the maximum of five transmissions), user device 210 and base station 230 may still wait the entire wait time before activating the TTI-B configuration.

After the wait time expires, base station 230 may activate TTI-B by sending an uplink resource grant to user device 210, via a PDCCH, that assigns radio resources to user device 210 consistent with the TTI-B configuration with the TTI-B index value of 3.

User device 210 may receive the uplink resource grant. User device 210 may also activate the TTI-B configuration (i.e., X=3 and N=5) with the TTI-B index value of 3 after the wait time expires by preparing to send three versions of uplink data in consecutive transmission time intervals.

As shown in FIG. 6C, base station 230 and user device 210 may start communicating using the TTI-B configuration with the index value of 3 during the communication session. For example, when communicating using the TTI-B configuration with the TTI-B index of 3, user device 210 may send three versions of the uplink data in consecutive transmission time intervals (e.g., each transmission time interval being 1 ms) and thus X=3 and F=2. Base station 230 may receive three versions of the uplink data (e.g., a bundle) and process the uplink data. If base station 230 is unable to successfully decode the uplink data, then base station 230 may send a NACK to user device 210 after 4 ms. User device 210 may receive the NACK and resend the three versions of uplink data to base station 230 16 ms (F*RTT=2*8=16) after the last uplink bundled transmission on PUSCH. User device 210 may resend bundled data on uplink until user device 210 receives an ACK from base station 230 or user device 210 exhausts all five transmissions (N=5) of the bundle of uplink data.

In this way, a TTI-B configuration may be activated during a communication session without having to perform an intra-cell handover of the communication session. The TTI-B configuration may be deactivated in a similar fashion by base station 230 sending a new MAC packet including an instruction to deactivate the TTI-B configuration.

As indicated above, FIGS. 6A-6C are provided merely as an example. Other examples are possible and may differ from what was described with regard to FIGS. 6A-6C.

Implementations described herein may configure TTI-B during setup of a communication session and/or inter-cell handover of the communication session, and activate or deactivate TTI-B during the communication session based on the configured TTI-B. For example, implementations described herein may send a downlink MAC layer command to a user device in a MAC control packet during the communication session to activate or deactivate TTI-B. In some implementations, TTI-B may be activated or deactivated without having to perform an intra-cell handover.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory storing instructions; and
one or more processors to execute instructions to:
send a connection message to a user device while a communication session is being established with the user device,
the connection message indicating a transmission time interval bundling (TTI-B) configuration to be configured by the user device;
determine whether to activate or deactivate the TTI-B configuration after the communication session is established;
send a control message to the user device during the communication session,
the control message instructing the user device to activate or deactivate the TTI-B configuration configured by the user device, and
the control message being separate from the connection message;
selectively generate a first uplink resource grant that permits the user device to send a particular amount of redundant uplink data in consecutive transmission time intervals based on determining to activate the TTI-B configuration for use during the communication session;
receive the redundant uplink data, from the user device, during the communication session based on generating the first uplink resource grant,
the particular amount of redundant uplink data received from the user device in consecutive transmission time intervals being based on the TTI-B configuration that was activated;
selectively generate a second uplink resource grant that permits the user device to send a single version of uplink data based on determining to deactivate the TTI-B configuration; and
receive the single version of uplink data, from the user device, during the communication session based on generating the second uplink resource grant.

2. The device of claim 1, where the one or more processors are further to:
activate the TTI-B configuration without performing an intra-cell handover of the communication session to activate the TTI-B configuration.

3. The device of claim 1, where the one or more processors are further to:
receive a completion message from the user device based on the connection message,
the completion message indicating that the user device is configured to use the TTI-B configuration, and
where the one or more processors, when determining whether to activate or deactivate the TTI-B configuration, are to:
determine to activate the TTI-B configuration based on the completion message.

4. The device of claim 1, where the one or more processors are further to:
store state information indicating the user device is in a configured state based on a completion message; and
where the one or more processors, when determining whether to activate or deactivate the TTI-B configuration, are to:
determine to activate the TTI-B configuration based on the state information indicating the user device is in the configured state.

5. The device of claim 1, where the connection message indicates a plurality of TTI-B configurations to be configured by the user device, and
where the one or more processors, when determining whether to activate or deactivate the TTI-B configuration, are to:
determine to activate one of the plurality of TTI-B configurations,
the one of the plurality of TTI-B configurations being the TTI-B configuration; and
where the one or more processors, when sending the control message, are to:
send the control message instructing the user device to activate the one of the plurality of TTI-B configurations.

6. The device of claim 1, where the connection message includes an instruction that instructs the user device to deconfigure prior TTI-B configurations and configure TTI-B configurations supported by the device,
the TTI-B configurations supported by the device including the TTI-B configuration.

7. A non-transitory computer-readable medium storing instructions, the instructions comprising:
one or more instructions that, when executed by one or more processors, cause the one or more processors to:
send a connection message to a user device while a communication session is being set up between the user device and a device,
the connection message indicating a transmission time interval bundling (TTI-B) configuration to be configured by the user device;
determine whether to activate or deactivate the TTI-B configuration after the communication session is setup;
send a control message to the user device during the communication session,
the control message instructing the user device to activate or deactivate the TTI-B configuration configured by the user device;
selectively generate a first uplink resource grant that permits the user device to send a particular amount of redundant uplink data in consecutive transmission time intervals based on determining to activate the TTI-B configuration for use during the communication session; and
receive the redundant uplink data from the user device, during the communication session, based on generating the first uplink resource grant,
the particular amount of redundant uplink data received from the user device in consecutive transmission time intervals being based on the TTI-B configuration that was activated;
selectively generate a second uplink resource grant that permits the user device to send a single version of uplink data based on determining to deactivate the TTI-B configuration; and
receive the single version of uplink data, from the user device, during the communication session based on generating the second uplink resource grant.

8. The non-transitory computer-readable medium of claim 7, where the one or more instructions, when executed by the one or more processors, further cause the one or more processors to:
calculate a particular amount of wait time based on a maximum number of transmissions of uplink data permitted before exhaustion and based on a round trip time,
the round trip time being an amount of time between retransmissions of uplink data; and
activate or deactivate the TTI-B configuration after waiting the particular amount of wait time.

9. The non-transitory computer-readable medium of claim 7, where the one or more instructions, when executed by the one or more processors, further cause the one or more processors to:
calculate a particular amount of wait time based on a maximum number of transmissions of uplink data permitted before exhaustion, a transmission time interval, and a number of versions of uplink data sent in consecutive transmission time intervals; and
activate or deactivate the TTI-B configuration after waiting the particular amount of wait time.

10. The non-transitory computer-readable medium of claim 7, where the one or more instructions, when executed by the one or more processors, further cause the one or more processors to:
receive an acknowledgment message from the user device based on the control message,
the acknowledgment message indicating the user device is ready to activate or deactivate the TTI-B configuration;
start waiting a particular amount of time based on when the acknowledgment message is received; and
activate or deactivate the TTI-B configuration after waiting the particular amount of time.

11. The non-transitory computer-readable medium of claim 7, where the one or more instructions, when executed by the one or more processors, further cause the one or more processors to:
send the first uplink resource grant to the user device after waiting a particular amount of time,
the first uplink resource grant assigning uplink resources to the user device.

12. The non-transitory computer-readable medium of claim 7, where the one or more instructions, are further to:
send a deactivation message to the user device during the communication session,
the deactivation message instructing the user device to deactivate the TTI-B configuration configured by the user device;
determine a certain amount of time to wait based on the TTI-B configuration; and
deactivate the TTI-B configuration after waiting the certain amount of time.

13. The non-transitory computer-readable medium of claim 7, where the control message includes a media access control (MAC) packet indicating a TTI-B index value associated with the TTI-B configuration to be activated, and
where the one or more instructions, that cause the one or more processors to send the control message, cause the one or more processors to:
send the control message to the user device on at least one of:
a Physical Downlink Shared Channel (PDSCH),
an enhanced Physical Downlink Control Channel (ePDCCH), or
a Physical Downlink Control Channel (PDCCH).

14. A method, comprising:
receiving, by a device, a connection message from a base station while a communication session is being established with the base station,
the connection message indicating a transmission time interval bundling (TTI-B) configuration to be configured by the device;

configuring, by the device, the TTI-B configuration based on the connection message;

receiving, by the device, a control message from the base station during the communication session, the control message instructing the device to activate or deactivate the TTI-B configuration configured by the device, and the control message being separate from the connection message;

selectively receiving, by the device and after waiting a particular amount of time, a first uplink resource grant that permits the device to send a particular amount of redundant uplink data in consecutive transmission time intervals based on the control message instructing the device to activate the TTI-B configuration; for use during the communication session; and sending, by the device, the redundant uplink data to the base station based receiving the first uplink resource grant, the particular amount of redundant uplink data sent to the base station in consecutive transmission time intervals being based on the TTI-B configuration that was activate;

selectively receiving, by the device, a second uplink resource grant that permits the device to send a single version of uplink data based on the control message instructing the device to deactivate the TTI-B configuration; and sending, by the device, the single version of uplink data during the communication session based on receiving the second uplink resource grant.

15. The method of claim 14, further comprising:
activating the TTI-B configuration without performing an intra-cell handover to activate the TTI-B configuration.

16. The method of claim 14, further comprising:
storing a TTI-B index value associated with the TTI-B configuration that the base station is configured to support.

17. The method of claim 14, further comprising:
calculating a particular amount of wait time based on a maximum number of transmissions of uplink data before exhaustion and based on a round trip time,
the round trip time being an amount of time between retransmissions of uplink data; and
activating or deactivating the TTI-B configuration after waiting the particular amount of wait time.

18. The method of claim 14, further comprising:
calculating a particular amount of wait time based on a maximum number of transmissions of uplink data permitted before exhaustion, a transmission time interval, and a number of versions of uplink data sent in consecutive transmission time intervals; and
activating or deactivating the TTI-B configuration after waiting the particular amount of wait time.

19. The method of claim 14, further comprising:
sending an acknowledgment message to the base station based on the control message,
the acknowledgment message indicating that the device is ready to activate or deactivate the TTI-B configuration;
starting to wait a particular amount of time based on when the acknowledgment message is sent; and
activating or deactivating the TTI-B configuration after waiting the particular amount of time.

20. The method of claim 14, further comprising:
receiving a deactivation message from the base station during the communication session,
the deactivation message instructing the device to deactivate the TTI-B configuration configured by the device;
determining a certain amount of time to wait based on the TTI-B configuration; and
deactivating the TTI-B configuration after waiting the certain amount of time.

* * * * *